United States Patent [19]

Price et al.

[11] 4,061,419
[45] Dec. 6, 1977

[54] VARIABLE MAGNIFICATION LENS SYSTEM

[75] Inventors: Edgar Elmer Price, Webster; Louise Leone Spurles, Rochester, both of, NY

[73] Assignee: Xerox Corporation, Stamford, Conn.

[21] Appl. No.: 663,397

[22] Filed: Mar. 3, 1976

[51] Int. Cl.² .............................................. G02B 15/14
[52] U.S. Cl. ..................................... 350/184; 350/215
[58] Field of Search ................................ 350/184, 215

[56] References Cited
U.S. PATENT DOCUMENTS

| | | | |
|---|---|---|---|
| 2,663,223 | 12/1953 | Hopkins | 350/184 |
| 3,687,522 | 8/1972 | Lynch | 350/184 |
| 3,728,010 | 4/1973 | Mikami | 350/184 |

Primary Examiner—Conrad J. Clark
Attorney, Agent, or Firm—Robert J. Bird

[57] ABSTRACT

A variable magnification lens is exemplified by a 6-element symmetrical zoom lens for use between fixed conjugates at magnification ranging from 1.007X to 0.615X. The outer elements remain fixed relative to the unit. The inner elements form two integral pairs on each side of the central aperture and move symmetrically with respect to it to effect magnification change while maintaining a substantially flat image field over the entire magnification range.

6 Claims, 2 Drawing Figures

VARIABLE MAGNIFICATION LENS SYSTEM

BACKGROUND OF THE INVENTION

This invention relates to variable magnification or zoom lenses, and more particularly to a zoom lens for use between fixed conjugate planes, as for example in a photocopying environment.

A zoom or varifocal lens is one in which the focal length can be continuously varied by moving one or more of the lens elements along the axis of the lens, the image being maintained in focus by either mechanical or optical means. The technology behind variable focal length lenses is relatively new in the long history of optics, having had most of its development since World War II. Many zoom lenses are presently known and are used in many different applications, including television, photography, and photocopying to which the present invention is primarily directed. In these prior art lenses, many different forms of interrelated lens movements are shown. These include symmetrical and asymmetrical lenses and lens movements, and a wide variety of interrelations of lens movement. U.S. Pat. No. 3,687,522 to Lynch and Carlough is considered representative of the art and the particular application to which the present invention is directed. Therein is disclosed a zoom lens in which the lens elements and their zoom movement are all symmetrical. In this 6-element lens, the end crown elements and their adjacent flint elements move in opposite directions, thereby changing the crown/flint spacings and the flint/meniscus spacings. Field curvature introduced by changing the separation of crown and flint elements is compensated for by the changed separation of the flint and meniscus elements. These movement of the crown and flint elements are different in extent because the lens is more sensitive to variation of axial separation between flint and meniscus elements than between crown and flint elements. Further, since the fixed part of the lens is the inner assembly of menisci, the mounting is relatively complex and costly.

It is an object of this invention to provide a variable magnification lens in which the outer elements remain fixed with respect to the lens.

Another object of this invention is to provide such a variable magnification lens in which the image field is kept substantially flat throughout the magnification range.

Another object of this invention is to provide such a variable magnification lens in which both the lens elements and their movement are symmetrical with respect to the lens center.

Other objects, advantages, and features of this invention will become apparent from the following more detailed description of an exemplary embodiment given in connection with the accompanying drawing.

DRAWING

DESCRIPTION

Figure 1:
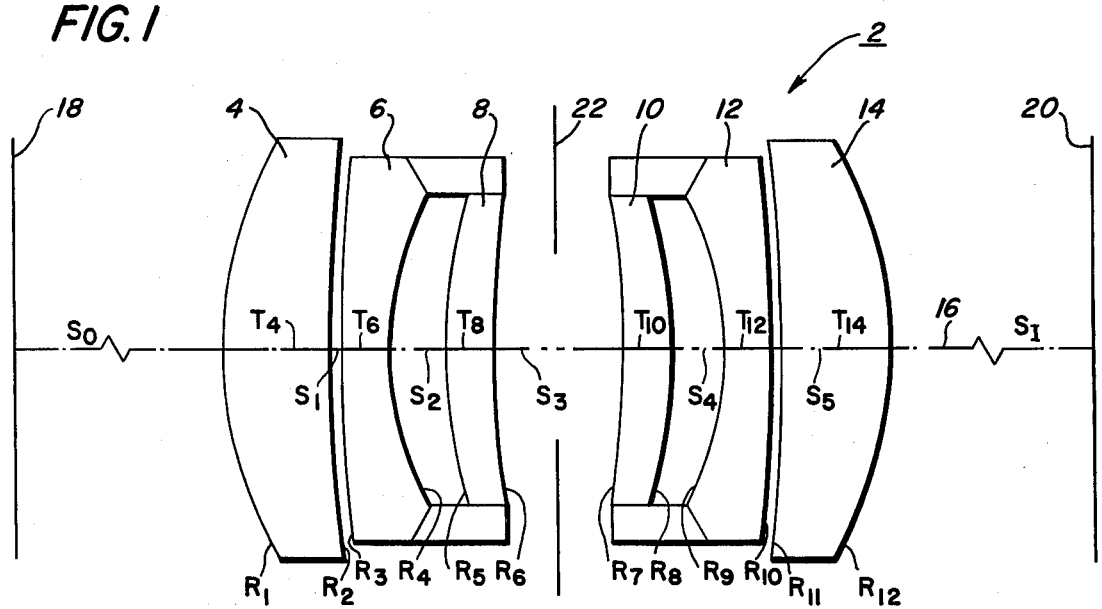
FIG. 1 is an optical diagram of a variable magnification lens according to the present invention, and shown at a first magnification.
Figure 2:
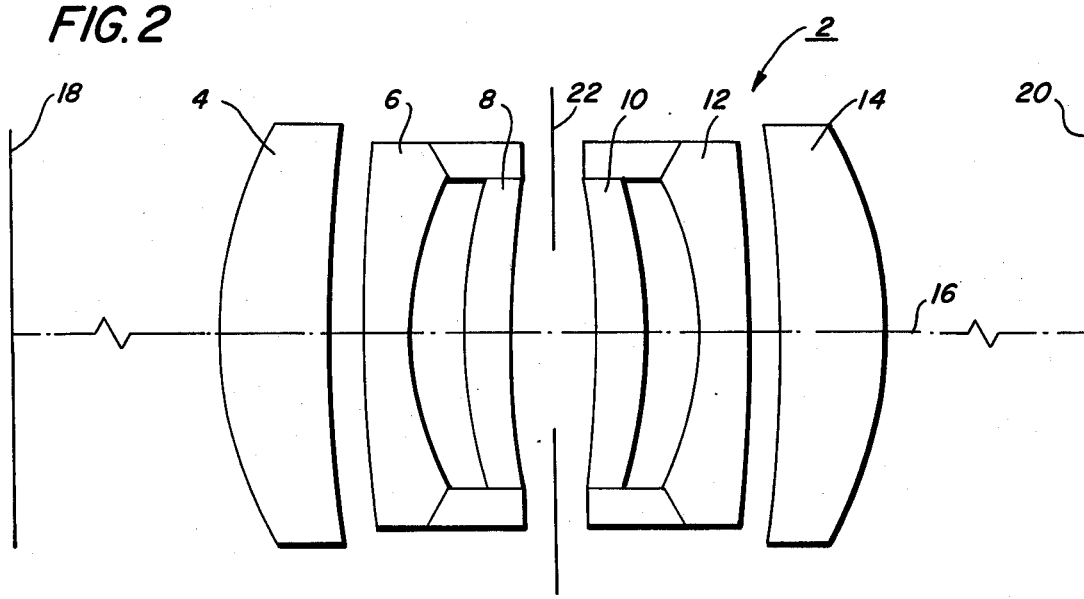
FIG. 2 is similar to FIG. 1 showing the same lens at a second smaller magnification.

Referring now to the drawing, a variable magnification or zoom lens is generally indicated at 2. It includes lens elements 4, 6, 8, 10, 12 and 14 in optical alignment along its optical axis 16. Zoom lens 2 is shown disposed between conjugate object and image planes 18 and 20 respectively.

Front lens element 4 is a positive crown element. Element 6 is a negative flint element. Element 8 is a meniscus element. Element 10 is a meniscus element. Element 12 is a negative flint element. Element 14 is a positive crown element. Elements 10, 12, and 14 are identical respectively with elements 8, 6, and 4 and are identically spaced with respect to the central lens aperture stop 22, the compound lens 2 thus being symmetrical.

The entire lens 2 is movable relative to conjugate planes 18 and 20 to change magnification. Within the lens 2, however, only elements 6, 8, 10, and 12 are movable. Elements 6 and 8 are fixed to one another as a unit for movement together. Similarly, elements 10 and 12 are fixed to one another as a unit for movement together. Movements of these two units 6, 8, and 10, 12 for changing the lens focal length are symmetrical with respect to the aperture stop 22. The fixture of elements 6 and 8 and of 10 and 12 together is not essential but is presently preferred. Suitable mechanism is provided for effecting the desired movements, but is not a part of this invention and is not shown herein.

By itself, the movement of flint elements 6 and 12 relative to the outer crown elements 4 and 14 introduces field curvature at the image plane. However, the movement of the meniscus elements in the same direction as the flint elements also introduces field curvature, but in the opposite sense. Thus, it has been found that by moving each meniscus element with its corresponding flint element as a unit relative to the outer crown elements, the field curvatures otherwise introduced are substantially balanced out with a net result of a substantially flat image field throughout the magnification range. As stated above with reference to U.S. Pat. No. 3,687,522, field curvature can also be controlled by variation of the crown-flint spaces and the flint-meniscus spaces. However, the lens sensitivities to the two movements are different and not as readily combined as in the present case in which the crown-flint and intermeniscus spaces are varied.

It is this property of this lens combination that enables the outer crown elements to remain stationary within the lens mount. The advantage of holding the outer elements fixed and moving the inner pairs as units is that the entire lens can be barrel mounted since the inner units are smaller in diameter than the outer crown elements. The fact that the inner elements 6 and 8 may form an integral unit, as may elements 10 and 12, gives rise to the further advantage that mounting and mechanism arrangements for the two movable units can be simplified.

A specific zoom lens in accordance with this invention is defined by the parameters listed in the following table in which $N_d$ is the refractive index for the $d$ line of sodium and $V_d$ is the dispersion value or Abbe number. Radii (R), thicknesses (T), and spacings (S) are expressed in inches and a negative sign indicates lens radii on centers of curvature on the object side of the lens. $S_O$ and $S_I$ indicate respectively spacings from object and image planes to their next adjacent lenses.

| Lens | Radius (R) | Thickness (T) | Spacing (S) | $N_d$ | $V_d$ |
|---|---|---|---|---|---|
| | | | $S_0$ | | |
| | | | (1.007X) 24.94296 | | |
| | | | (0.800X) 28.07371 | | |
| | | | (0.615X) 31.56181 | | |
| 4 | $R_1$ 2.50358 | | | | |
| | $R_2$ 31.64727 | $T_4$ .72176 | | 1.5891 | 61.27 |
| | | | $S_1$ | | |
| | | | (1.007X) .05202 | | |
| | | | (0.800X) .06872 | | |
| | | | (0.615X) .13403 | | |
| 6 | $R_3$ 37.17555 | | | | |
| | $R_4$ 1.99482 | $T_6$ .29455 | | 1.5919 | 48.51 |
| | | | $S_2$ | | |
| | | | .37619 | | |
| 8 | $R_5$ 3.58139 | | | | |
| | $R_6$ 6.15101 | $T_8$ .30862 | | 1.6031 | 60.60 |
| | | | $S_3$ | | |
| | | | (1.007X) .83602 | | |
| | | | (0.800X) .80262 | | |
| | | | (0.615X) .67198 | | |
| 10 | $R_7$ −6.15101 | | | | |
| | $R_8$ −3.58139 | $T_{10}$ .30862 | | 1.6031 | 60.60 |
| | | | $S_4$ | | |
| | | | .37619 | | |
| 12 | $R_9$ −1.99482 | | | | |
| | $R_{10}$ −37.17555 | $T_{12}$ .29455 | | 1.5919 | 48.51 |
| | | | $S_5$ | | |
| | | | (1.007X) .05202 | | |
| | | | (0.800X) .06872 | | |
| | | | (0.615X) .13403 | | |
| 14 | $R_{12}$ −31.64727 | | | | |
| | $R_{14}$ −2.50358 | $T_{14}$ .72176 | | 1.5891 | 61.27 |
| | | | $S_I$ | | |
| | | | (1.007X) 25.13348 | | |
| | | | (0.800X) 22.00273 | | |
| | | | (0.615X) 18.51462 | | |

The foregoing description of a specific embodiment of this invention is given by way of illustration and not of limitation. The invention is more broadly conceived and embraces the general combination of lens elements including outer crown elements, inner flint elements and innermost meniscus elements, the crown elements being stationary with each flint/meniscus combination movable relative to the crowns for varifocal operation.

The movement of both flint/meniscus pairs 6, 8 and 10, 12 as units and in symmetry is the preferred embodiment of this invention. Such concurrent movement of the two pairs provides the best balance of effect throughout the largest magnification range. However, it is possible, and within the contemplation of this invention, to move only one of the flint/meniscus pairs and such movement may be suitable for a smaller magnification range. Furthermore, the flint and meniscus elements need not form integral pairs; they may be disposed for movement separately as desired.

What is claimed is:

1. A variable magnification lens including the following lens elements in alignment along an optical axis:
   a front positive crown element,
   a front negative flint element spaced from said crown element,
   a front meniscus element spaced from said flint element,
   a back meniscus element spaced from said front meniscus element,
   a back negative flint element spaced from said back meniscus element,
   a back positive crown element spaced from said back flint element,
   said crown elements being fixed relative to each other,
   said flint and meniscus elements being movable along said optical axis to vary the focal length of said lens.

2. A variable magnification lens as defined in claim 1 in which:
   said front flint element and said front meniscus element are integrally connected as a unit for movement together along said optical axis, and
   said back flint element and said back meniscus element are integrally connected as a unit for movement together along said optical axis.

3. A variable magnification lens as defined in claim 1, in which:
   said back meniscus, flint, and crown elements are identical to said front meniscus, flint, and crown elements respectively, and are disposed in inverse order and facing relationship thereto in symmetrical arrangement.

4. A variable magnification lens including the following lens elements in alignment along an optical axis:
   a front positive crown element,
   a front negative flint element spaced from said crown element,
   a front meniscus element spaced from said flint element,
   a back meniscus element spaced from said front meniscus element,
   a back negative flint element spaced from said back meniscus element,
   a back positive crown element spaced from said back flint element,
   said crown elements being fixed relative to each other,
   said front flint and front meniscus elements together forming an integral pair,
   said back flint and back meniscus elements together forming an integral pair,
   at least one of said pairs being movable along said optical axis relative to said crown elements to vary the focal length of said lens.

5. A variable magnification lens including the following lens elements in alignment along an optical axis:
   a front positive crown element,
   a front negative flint element spaced from said crown element,
   a front meniscus element spaced from said flint element,
   a back meniscus element spaced from said front meniscus element,
   a back negative flint element spaced from said back meniscus element,
   a back positive crown element spaced from said back flint element,
   said crown elements being fixed relative to each other,
   said flint and meniscus elements being movable along said optical axis to vary the focal length of said lens,
   the parameters of lens radii (R) thicknesses (T) spacings (S) refractive indices ($N_d$) and dispersion values ($V_d$) being in accordance with the following table wherein radii, thicknesses, and spacings are expressed in inches and a negative sign indicates lens radii on centers of curvature on the object side of the lens:

| Lens | Radius (R) | Thickness (T) | Spacing (S) | $N_d$ | $V_d$ |
|---|---|---|---|---|---|
| 4 | $R_1$ 2.50358<br>$R_2$ 31.64727 | $T_4$ .72176 | | 1.5891 | 61.27 |
| | | | $S_1$<br>(1.007X) .05202<br>(0.800X) .06872<br>(0.615X) .13403 | | |
| 6 | $R_3$ 37.17555<br>$R_4$ 1.99482 | $T_6$ .29455 | | 1.5919 | 48.51 |
| | | | $S_2$<br>.37619 | | |
| 8 | $R_5$ 3.58139<br>$R_6$ 6.15101 | $T_8$ .30862 | | 1.6031 | 60.60 |
| | | | $S_3$<br>(1.007X) .83602<br>(0.800X) .80262<br>(0.615X) .67198 | | |
| 10 | $R_7$ −6.15101<br>$R_8$ −3.58139 | $T_{10}$ .30862 | | 1.6031 | 60.60 |
| | | | $S_4$<br>.37619 | | |
| 12 | $R_9$ −1.99482<br>$R_{10}$ −37.17555 | $T_{12}$ .29455 | | 1.5919 | 48.51 |
| | | | $S_5$<br>(1.007X) .05202<br>(0.800X) .06872<br>(0.615X) .13403 | | |
| 14 | $R_{12}$ −31.64727<br>$R_{14}$ −2.50358 | $T_{14}$ .72176 | | 1.5891 | 61.27 |

6. A variable magnification lens including the following lens elements in alignment along an optical axis:
   a front positive crown element,
   a front negative flint element spaced from said crown element,
   a front meniscus element spaced from said flint element,
   a back meniscus element spaced from said front meniscus element,
   a back negative flint element spaced from said back meniscus element,
   a back positive crown element spaced from said back flint element,
   said crown elements being fixed relative to each other,
   said flint and meniscus elements being movable along said optical axis to vary the focal length of said lens,
   the parameters of lens radii (R) thicknesses (T) spacings (S) refractive indices ($N_d$) and dispersion values ($V_d$) being in accordance with the following table wherein radii, thicknesses, and spacings are expressed in inches and a negative sign indicates lens radii on centers of curvature on the object side of the lens:

| Lens | Radius (R) | Thickness (T) | Spacing (S) | $N_d$ | $V_d$ |
|---|---|---|---|---|---|
| | | | $S_0$<br>(1.007X) 24.94296<br>(0.800X) 28.07371<br>(0.615X) 31.56181 | | |
| 4 | $R_1$ 2.50358<br>$R_2$ 31.64727 | $T_4$ .72176 | | 1.5891 | 61.27 |
| | | | $S_1$<br>(1.007X) .05202<br>(0.800X) .06872<br>(0.615X) .13403 | | |
| 6 | $R_3$ 37.17555<br>$R_4$ 1.99482 | $T_6$ .29455 | | 1.5919 | 48.51 |
| | | | $S_2$<br>.37619 | | |
| 8 | $R_5$ 3.58139<br>$R_6$ 6.15101 | $T_8$ .30862 | | 1.6031 | 60.60 |
| | | | $S_3$<br>(1.007X) .83602<br>(0.800X) .80262<br>(0.615X) .67198 | | |
| 10 | $R_7$ −6.15101<br>$R_8$ −3.58139 | $T_{10}$ .30862 | | 1.6031 | 60.60 |
| | | | $S_4$<br>.37619 | | |
| 12 | $R_9$ −1.99482<br>$R_{10}$ −37.17555 | $T_{12}$ .29455 | | 1.5919 | 48.51 |
| | | | $S_5$<br>(1.007X) .05202<br>(0.800X) .06872<br>(0.615X) .13403 | | |
| 14 | $R_{12}$ −31.64727<br>$R_{14}$ −2.50358 | $T_{14}$ .72176 | | 1.5891 | 61.27 |
| | | | $S_I$<br>(1.007X) 25.13348<br>(0.800X) 22.00273<br>(0.615X) 18.51462 | | |

* * * * *